Dec. 25, 1956    P. CHRISTEN    2,775,277
EGG SEPARATOR
Filed Nov 1, 1954    2 Sheets-Sheet 1
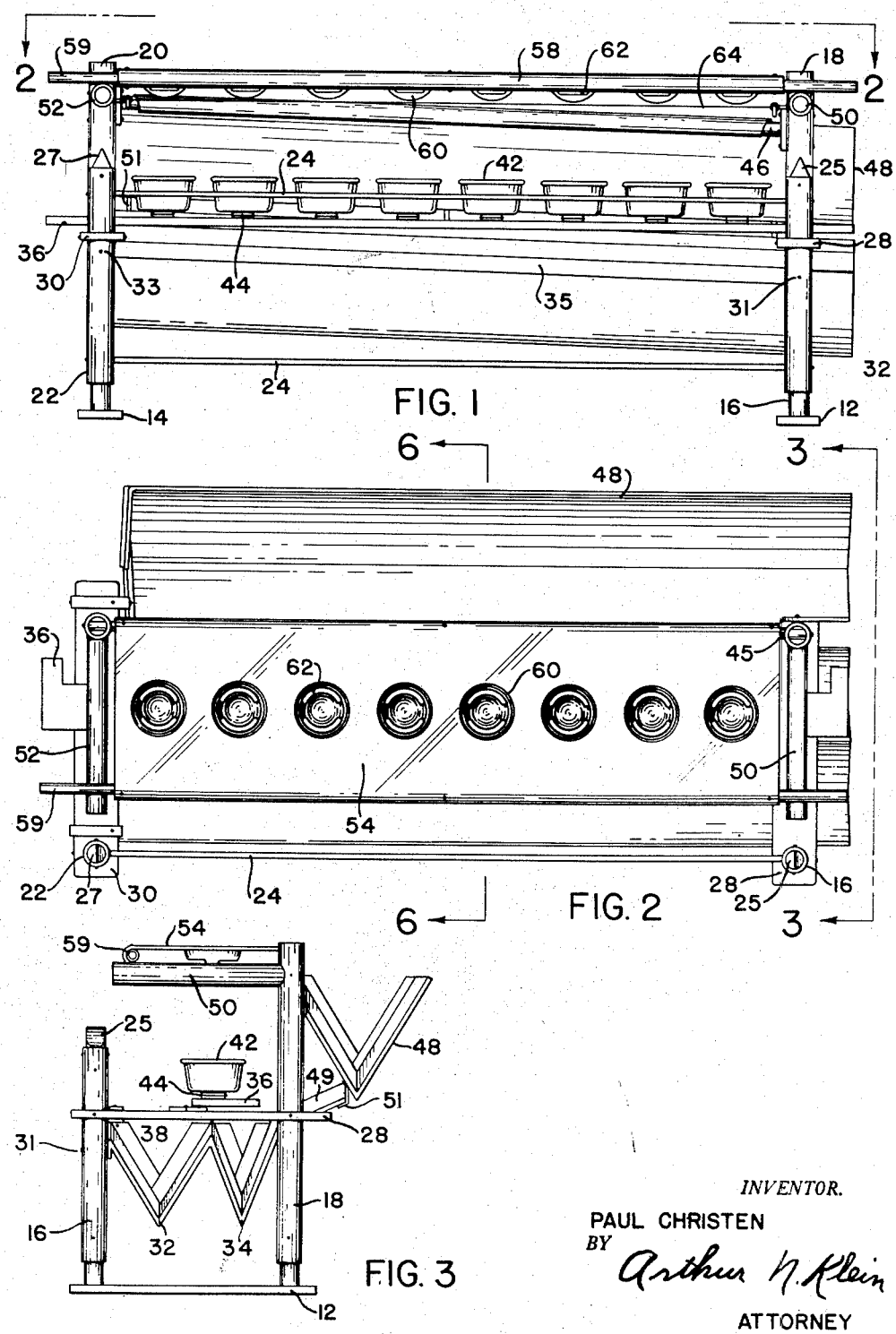
INVENTOR.
PAUL CHRISTEN
BY Arthur N. Klein
ATTORNEY

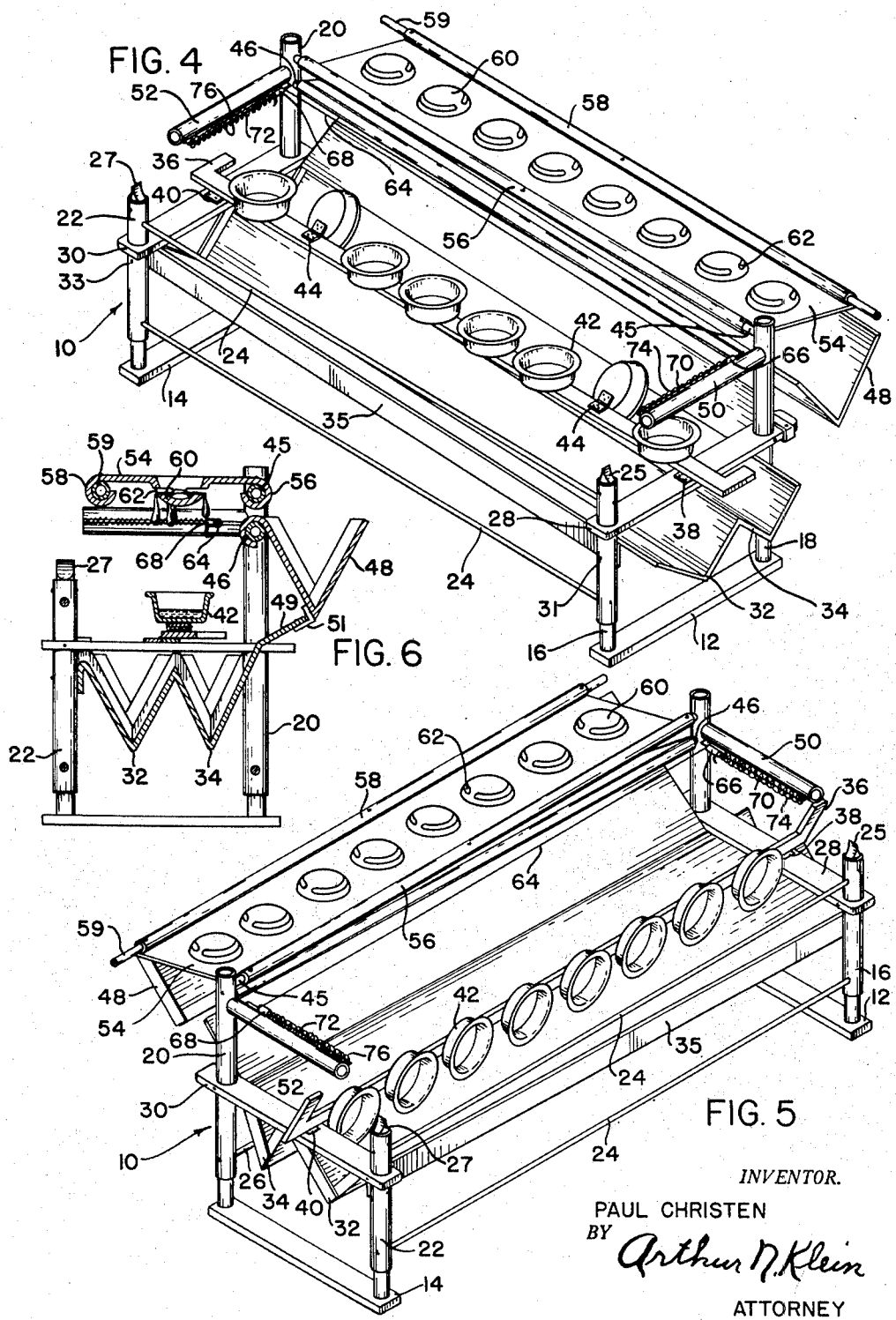

United States Patent Office 2,775,277
Patented Dec. 25, 1956

2,775,277

EGG SEPARATOR

Paul Christen, Philadelphia, Pa.

Application November 1, 1954, Serial No. 465,817

5 Claims. (Cl. 146—2)

The present invention relates to an egg separator, and more particularly to an egg separator in which virtually pure egg white may be obtained.

The preparation of relatively pure egg white for fine pastries and other culinary purposes has presented a problem. Due to the inherent nature of eggs, inevitably, a certain percentage of the yolks will break and will become dispersed in the egg white. In conventional egg separators this results in a mixture of yolk and egg white so that the egg white is almost always contaminated with some yolk.

This invention has as an object the provision of an egg separator of simple and durable construction in which egg whites may be cleanly separated from yolks and pure egg white may be obtained.

A further object of the present invention is the provision of an egg separator in which egg white, yolk, and egg white-yolk mixtures are obtained.

Other objects of the present invention are apparent in the following detailed description, appended claims and accompanying drawings.

For the purpose of illustrating this invention, one form thereof, which is presently preferred, is shown in the accompanying drawings; it being understood, however, that the invention is not limited to the precise arrangements and instrumentalities illustrated.

In the accompanying drawings, wherein like reference characters indicate like parts throughout:

Figure 1 is a front elevational view of the egg separator of the present invention.

Figure 2 is a top plan view of the egg separator of the present invention.

Figure 3 is a side elevational view of the egg separator of the present invention.

Figure 4 is a perspective view of the egg separator of the present invention with the yolk tray tilted over the yolk trough and with a plurality of the egg white cups tilted over and into the egg white-and-yolk mixture trough.

Figure 5 is a perspective view of the egg separator of the present invention in which the egg white cup arm is tilted so that the egg white cups are emptying into the egg white trough.

Figure 6 is a transverse section on line 6—6 of Fig. 2.

In the accompanying drawings, 10 designates the egg separator frame comprising flat foot-bars or plates 12 and 14. Supporting posts 16 and 18 are inserted in, as by screwing, or carried by, as by welding, at the corners of foot-bar 12, and supporting posts 20 and 22 are inserted in, as by screwing, or carried by, as by welding, at the corners of foot-bar 14. Supporting posts 16 and 22 are secured together by tie rods 24 and supporting posts 18 and 20 are secured together by tie rod 26. Eggbreakers 25 and 27 may be provided at the top of posts 16 and 22.

Support bars 28 and 30 respectively join posts 16 and 18, 20 and 22, intermediate tie rods 24. Support bars 28 and 30 are fixedly secured to respective posts 16 and 18, 20 and 22, and the upper surfaces of support bars 28 and 30 are parallel to each other.

Beneath support bars 28 and 30 and intermediate supporting posts 16, 18, 20 and 22 are a pair of V-shaped troughs 32 and 34; trough 32 being an egg-white receiving trough and being disposed adjacent supporting posts 16 and 22, and secured thereto by pins 31 and 33 in posts 16 and 22 passing through a dependent flange 35 on trough 32; and trough 34 being adjacent supporting posts 18 and 20. Trough 34 is a mixed-egg receiving trough and is integral on its center edge with trough 32 and is secured at its outer edge as more fully explained below.

As seen particularly in Fig. 1, troughs 32 and 34 are angularly disposed in respect to the horizontal, tilting downwardly from the portion proximate supporting posts 20 and 22 to the portion proximate supporting posts 16 and 18. Troughs 32 and 34 extend beyond supporting posts 16 and 18 a sufficient distance to permit collecting vessels to be placed beneath the outermost free edge thereof and receive their contents.

An egg white cup-arm 36 is pivotally hinged by means of piano or like butt hinges 38 and 40 to the upper surface of respective support bars 28 and 30. Cup-arm 36 carries a plurality of egg white receiving-cups 42, each of which is pivotally hinged by means of a piano hinge or the like 44 to the upper surface of cup-arm 36 so that it may be pivoted from a position in which the floor of the cup is flush against the upper surface of the cup-arm 36 to a position in which the cup is tilted over the side of cup-arm 36 proximate trough 34 (in Fig. 4 the egg white receiving cups next adjacent the end cups on cup-arm 36 are so tilted).

The cup-arm 36 is a flat U-shaped bar with an extended U-base and as may be seen by comparing Figs. 4 and 5, in one pivoted position, the cup arm rests flush on the upper surface of support bars 28 and 30 with the cups disposed over the apex forming the juncture between V-shaped troughs 32 and 34, and in another pivoted position all of the cups are tilted over trough 32.

A pivot bar 45 joins the upper end portion of supporting posts 18 and 20 proximate the upper end thereof. Beneath and parallel to pivot bar 45 and also adjoining supporting posts 18 and 20 is trough carrying bar 46 on which trough 48 is carried beyond supporting posts 18 and 20. As shown particularly in Fig. 1, trough 48 is tilted angularly to the horizontal from its upper portion proximate supporting post 20 to its lower portion proximate supporting post 18. Trough 48 projects beyond supporting post 18 a sufficient distance to permit a yolk-receiving vessel to be supported therebeneath. An extension flange 49 projects from trough 32 and is secured to an angle flange 51 fixedly secured proximate the bottom of trough 48. In this manner both troughs 34 and 48 are anchored in position.

Stop bars 50 and 52 are fixedly secured in posts 18 and 20 intermediate pivot bar 45 and trough carrying bar 46 and are parallel to the upper surface of support bars 28 and 30 and perpendicular to supporting posts 18 and 20.

A yolk tray 54 having a pair of inturned edge-sleeves 56 and 58, the latter of which contains a support rod 59, is pivotally carried on pivot bar 45 and may be pivoted from the position shown in Figs. 4 and 5 in which the yolk tray 54 is resting over trough 48 to the position shown in Figs. 1, 2, 3 and 6 and in which the yolk tray 54 is resting with support rod 59 in sleeve 58 carried on stop bars 50 and 52.

Yolk tray 54 contains a plurality of integrally-formed egg-receiving and yolk-retaining pockets 60, each of which is aligned with and juxtaposed over an egg white receiving cup 42 on cup-arm 36. As shown particularly in Fig. 6, yolk pockets 60 are arcuately slotted, a pair of aligned slots 62 being provided in each of the yolk cups, which slots 62 are positioned above the bottommost portion of yolk cup 60 a distance substantially equal to the height of an egg yolk.

An egg white cutting wire 64 is carried between sleeves 66 and 68 which in turn are carried on respective U-shaped rods 70 and 72 fixedly secured on the innermost surface of stop bars 50 and 52. Respective tension springs 74 and 76 are carried on rods 70 and 72 and urge tubular bars 66 and 68 toward supporting posts 18 and 20.

The operation of the egg separator of the present invention is as follows:

With the egg separator disposed as shown in Figs. 1–3, an egg is cracked on either breaker 25 or 27 and the contents dropped into one of the egg cups 60. The egg white falls through slots 62 in yolk cup 60 and is collected in the egg white receiving-cup 42 disposed thereneath. Should difficulty be encountered in removing the egg white from yolk cup 60, the egg white may be cut by egg white cutting wire 64, which may be pulled against the tension of the springs 74 and 76 in the direction of posts 16 and 22. When a yolk has been collected in each of the yolk cups 60, yolk tray 54 is tilted backward and over yolk receiving trough 48 as shown in Figs. 4 and 5; the yolks being discharged into the trough and draining therefrom into a yolk receiving vessel (not shown). The egg whites which are caught in egg white receiving-cups 42 are received in egg white receiving trough 32 by pivoting cup arm 36 forward to the position shown in Fig. 5. The egg whites may be removed from trough 32 by placing a receptacle (not shown) under the projecting end of trough 32.

In some cases the yolk will break so that a mixture of yolk and egg white will be transmitted to one or more of the egg white receiving cups 42. In such cases the individual egg white receiving cup containing the mixed-egg is pivoted backward on its hinge as illustrated with two of the cups in Fig. 4 and tilted over trough 34 from which the mixture of egg white and yolk is removed by a suitable vessel (not shown) placed beneath the projecting end of trough 34.

The present invention may be embodied in other specific forms and, therefore, the foregoing description is to be considered in all respects merely as illustrative and not restrictive, reference being made to the appended claims as indicating the scope of this invention.

Having thus described my invention, I claim as new and desire to protect by Letters Patent, the following:

1. An egg separator comprising an elongated frame, an elongated laterally disposed yolk tray pivotally mounted adjacent the top of the frame, said tray being provided with a plurality of integrally formed laterally spaced arcuately slotted egg-receiving yolk-retaining pockets or depressions, said tray being pivotable from a generally horizontal right-side-up egg receiving position to a generally upside-down yolk discharging position, a laterally inclined yolk receiving trough mounted adjacent the top of the frame and extending underneath the yolk discharging position of the yolk tray, a laterally disposed cup arm pivotally mounted on the frame below the level of the yolk tray, said cup arm having a plurality of laterally spaced individual egg-white receiving cups mounted thereon, said cup arm being horizontally positioned with the individual receiving cups disposed in upright position below and in vertical alignment with the corresponding tray pockets when the tray is in its horizontal egg receiving position whereby the egg-white is capable of dripping down through the slots in the pockets and into the corresponding individual cups, a laterally inclined egg-white receiving trough mounted on the frame below the level of the cup arm, said cup arm being pivotable to a generally vertical position so as to move all of the cups simultaneously to egg-white discharging position above the egg-white receiving trough, a laterally inclined mixed-egg receiving trough mounted on said frame alongside of the egg-white receiving trough, each of the individual cups being pivotally mounted on the cup arm to tilt in a direction opposite to the pivoting direction of the cup arm whereby, when the cup arm is in its normal horizontal position, individual cups can be tilted independently from their upright receiving position to discharge mixed-egg into the mixed-egg receiving trough.

2. A construction according to claim 1 wherein an elongated laterally disposed egg-white cutting wire is mounted on the frame just below the yolk tray, said wire being movable forward and backward along the frame into simultaneous wiping contact with the underside of each of the several yolk-retaining pockets, and wherein spring means are structurally associated with said wire normally to urge said wire away from the pockets, and wherein means are provided for manually moving the wire to egg-white cutting position against the force of the spring means.

3. A construction according to claim 1 wherein all of the receiving troughs are downwardly inclined in the same direction with their lower ends terminating adjacent one end of the frame and somewhat above the bottom of the frame whereby receiving receptacles can be positioned beneath the lower ends.

4. A construction according to claim 3 wherein the egg-white receiving trough and the mixed-egg receiving trough are integrally formed, and wherein the yolk receiving trough is mounted at the rear of the elongated frame with its bottom supported by the rearmost of the aforesaid integrally-formed troughs.

5. A construction according to claim 1 wherein the yolk receiving trough is mounted at the rear of the elongated frame, the yolk tray being pivotable rearwardly of the elongated frame to yolk discharging position, wherein the egg-white receiving trough is mounted on the frame forward of the cup arm, the cup arm being pivotable forwardly to egg-white discharging position, and wherein the mixed-egg receiving trough is mounted on the frame rearward of the cup arm, the individual cups being tiltable rearwardly to mixed egg discharging position.

References Cited in the file of this patent

UNITED STATES PATENTS

| | | |
|---|---|---|
| 1,747,432 | Eskholme | Feb. 18, 1930 |
| 1,795,118 | Hall | Mar. 3, 1931 |